(12) United States Patent
Puvvada et al.

(10) Patent No.: US 11,321,194 B2
(45) Date of Patent: May 3, 2022

(54) RECOVERY FROM A CLUSTERED FILE SYSTEM QUEUE FAILURE EVENT USING A MODIFIED EXTENDED ATTRIBUTE OF A FILE

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ashish Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/839,877

(22) Filed: Apr. 3, 2020

(65) Prior Publication Data

US 2021/0311840 A1    Oct. 7, 2021

(51) Int. Cl.
*G06F 11/14*    (2006.01)
*G06F 16/16*    (2019.01)
*G06F 11/16*    (2006.01)

(52) U.S. Cl.
CPC ...... *G06F 11/1469* (2013.01); *G06F 11/1629* (2013.01); *G06F 16/166* (2019.01)

(58) Field of Classification Search
CPC .. G06F 11/14; G06F 11/1469; G06F 11/1629; G06F 11/166
See application file for complete search history.

(56) References Cited

U.S. PATENT DOCUMENTS

| | | | |
|---|---|---|---|
| 9,495,478 B2* | 11/2016 | Hendrickson | G06F 16/9024 |
| 9,772,787 B2* | 9/2017 | Oikarinen | G06F 3/0643 |
| 10,264,071 B2* | 4/2019 | Vincent | H04L 67/146 |
| 10,372,685 B2* | 8/2019 | Vincent | G06F 16/182 |
| 10,691,666 B1* | 6/2020 | McDowell | G06F 16/2358 |
| 2003/0182328 A1* | 9/2003 | Paquette | G06F 16/27 |
| 2006/0010495 A1* | 1/2006 | Cohen | G06F 21/56 726/24 |
| 2015/0277802 A1* | 10/2015 | Oikarinen | G06F 3/061 711/114 |
| 2015/0278243 A1* | 10/2015 | Vincent | G06F 16/182 707/634 |
| 2015/0278397 A1* | 10/2015 | Hendrickson | G06F 16/9024 707/798 |

(Continued)

Primary Examiner — Kamini B Patel
(74) Attorney, Agent, or Firm — Zilka-Kotab, P.C.

(57) ABSTRACT

A computer-implemented method according to one embodiment includes, in response to a determination that a predetermined operation has been performed on an object of a first file stored on a first cluster site, storing predetermined information about the object of the first file stored on the first cluster site. The predetermined information is stored on an extended attribute of the first file stored on the first cluster site. In response to a determination that the predetermined operation is performed on an object of a first file stored on a second cluster site, the predetermined information is removed from the extended attribute of the first file stored on the first cluster site. In response to a determination that a failure event has occurred on a queue of the first cluster site, a predetermined recovery process is performed, thereby enabling fulfillment of entries of the queue of the first cluster site.

20 Claims, 8 Drawing Sheets

(56) References Cited

U.S. PATENT DOCUMENTS

| | | | |
|---|---|---|---|
| 2015/0280959 A1* | 10/2015 | Vincent | G06F 3/0622 |
| | | | 709/203 |
| 2016/0117337 A1* | 4/2016 | Aron | G06F 16/1767 |
| | | | 707/690 |
| 2016/0154817 A1* | 6/2016 | Mason, Jr | G06F 16/1774 |
| | | | 707/704 |
| 2016/0321295 A1* | 11/2016 | Dalton | G06F 16/14 |
| 2017/0060701 A1* | 3/2017 | Dave | G06F 11/1662 |

* cited by examiner

412 ⟶

```
┌─────────────────────────────────────────────┐
│ Determine files stored on the first cluster │
│ site having a respective extended attribute │─ 422
│ that includes a current name of an object   │
│ stored thereon                              │
└─────────────────────────────────────────────┘
                       │
                       ▼
┌─────────────────────────────────────────────┐
│ Output an instruction to perform the remove │
│ operation on objects of files stored on the │
│ second cluster site that are associated     │─ 424
│ with objects of the determined files stored │
│ on the first cluster site                   │
└─────────────────────────────────────────────┘
```

```
┌─────────────────────────────────────────────┐
│ Determine files stored on the first cluster │
│ site having a respective extended attribute │
│ that includes a previous name of the object │
│ of the first file stored on the first       │─ 426
│ cluster site and/or a parent inode number   │
│ from which the object of the first file     │
│ stored on the first cluster site is being   │
│ renamed                                     │
└─────────────────────────────────────────────┘
                       │
                       ▼
┌─────────────────────────────────────────────┐
│ Output an instruction to perform the rename │
│ operation on objects of files stored on the │
│ second cluster site that are associated     │─ 428
│ with objects of the determined files stored │
│ on the first cluster site                   │
└─────────────────────────────────────────────┘
```

FIG. 4C

RECOVERY FROM A CLUSTERED FILE SYSTEM QUEUE FAILURE EVENT USING A MODIFIED EXTENDED ATTRIBUTE OF A FILE

BACKGROUND

The present invention relates to clustered file system environments, and more specifically, this invention relates to replication of data between file systems on a first cluster site and a second cluster site.

File systems may exist and be shared at more than one physical location where the file system is mounted on multiple servers. One specific type of such a shared file system includes a clustered file system. Clustered file systems are often used to store redundant copies of data, and enable use of different servers to access a common file at the same time. For example, a first copy of an instance of data may be stored on a local cluster site, and a second copy of the instance of data may be stored on a remote cluster site. These copies of data are sometimes referred to as duplicate copies of data, which may be used as a backup, e.g., for recovery in case a cluster of the clustered file system and/or a duplicate copy stored thereon becomes compromised.

SUMMARY

A computer-implemented method according to one embodiment includes, in response to a determination that a predetermined operation has been performed on an object of a first file stored on a first cluster site, storing predetermined information about the object of the first file stored on the first cluster site. The predetermined information is stored on an extended attribute of the first file stored on the first cluster site. In response to a determination that the predetermined operation is performed on an object of a first file stored on a second cluster site, the predetermined information is removed from the extended attribute of the first file stored on the first cluster site. In response to a determination that a failure event has occurred on a queue of the first cluster site, a predetermined recovery process is performed, thereby enabling fulfillment of entries of the queue of the first cluster site.

A computer program product for recovery from a clustered file system queue failure event using a modified extended attribute of a file, according to another embodiment includes a computer readable storage medium having program instructions embodied therewith. The program instructions are readable and/or executable by a controller to cause the controller to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4B is a flowchart of a plurality of sub-operations of an operation of the method of FIG. 4A.

FIG. 4C is a flowchart of a plurality of sub-operations of an operation of the method of FIG. 4A.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for recovery from a clustered file system queue failure event using a modified extended attribute of a file.

In one general embodiment, a computer-implemented method includes, in response to a determination that a predetermined operation has been performed on an object of a first file stored on a first cluster site, storing predetermined information about the object of the first file stored on the first cluster site. The predetermined information is stored on an extended attribute of the first file stored on the first cluster site. In response to a determination that the predetermined operation is performed on an object of a first file stored on a second cluster site, the predetermined information is removed from the extended attribute of the first file stored on the first cluster site. In response to a determination that a failure event has occurred on a queue of the first cluster site, a predetermined recovery process is performed, thereby enabling fulfillment of entries of the queue of the first cluster site.

In another general embodiment, a computer program product for recovery from a clustered file system queue failure event using a modified extended attribute of a file includes a computer readable storage medium having program instructions embodied therewith. The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

Figure 1:
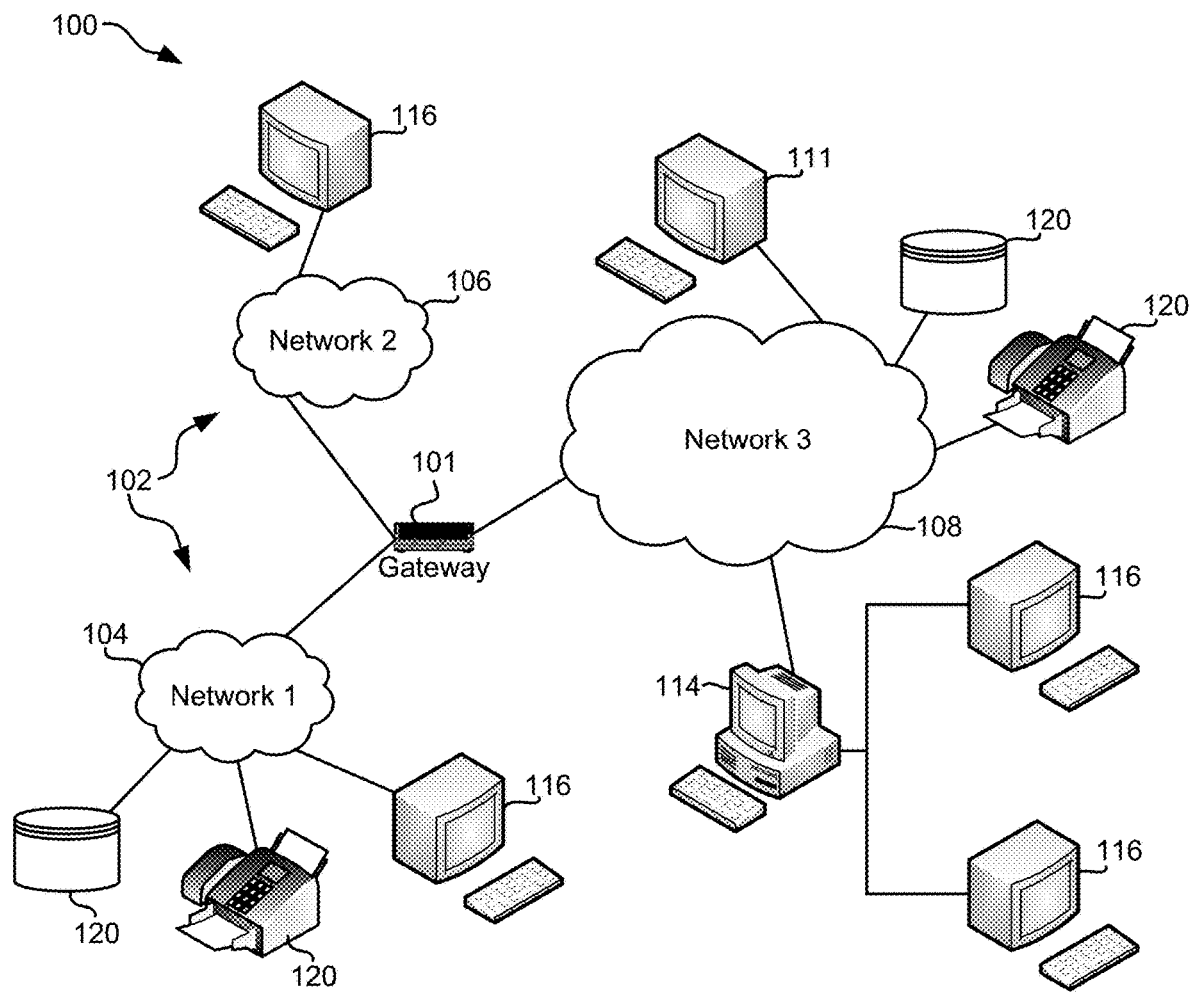
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
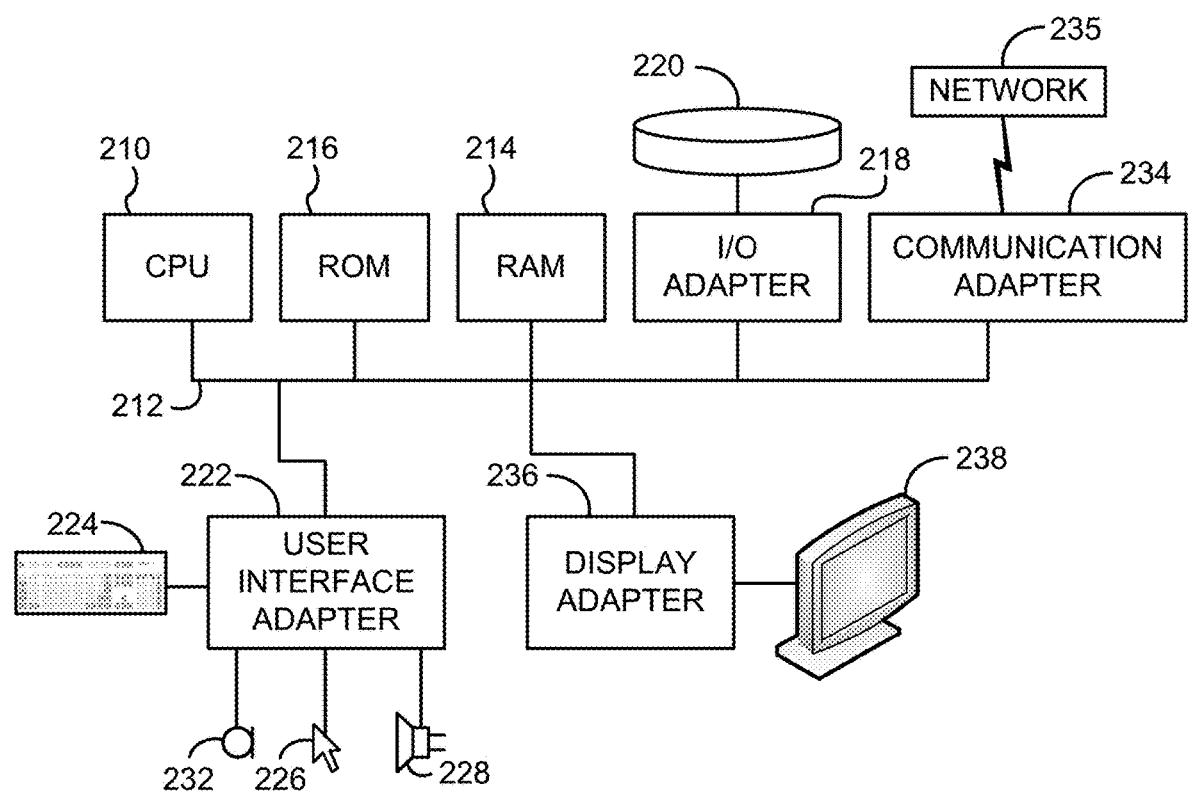
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
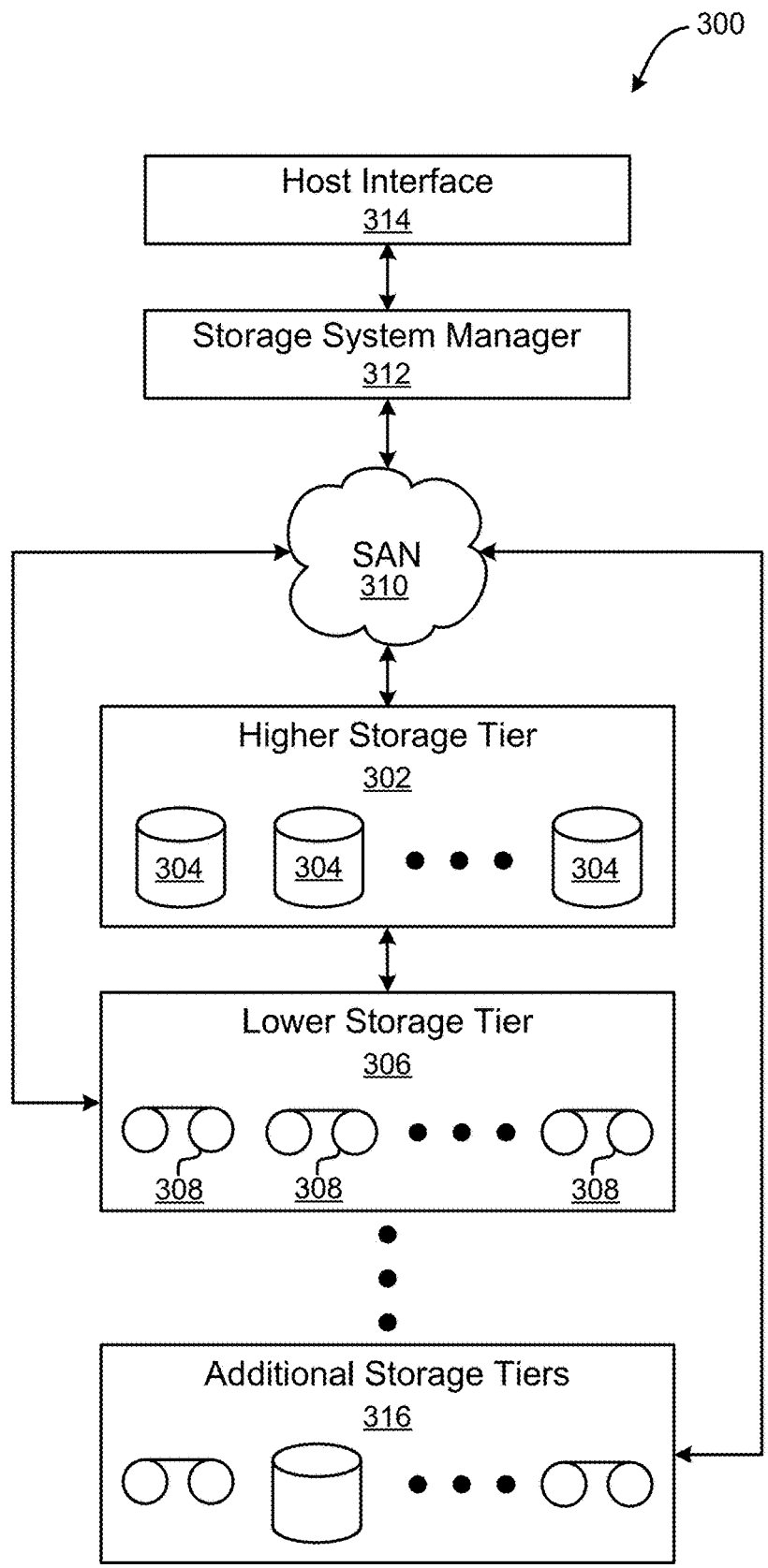
FIG. 3 illustrates a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As described elsewhere above, file systems may exist and be shared at more than one physical location where the file system is mounted on multiple servers. One specific type of such a shared file system includes a clustered file system. Clustered file systems are often used to store redundant copies of data, and enable use of different servers to access a common file at the same time. For example, a first copy of an instance of data may be stored on a local cluster site, and a second copy of the instance of data may be stored on a remote cluster site. In some approaches, techniques such as, e.g., van caching, data backup, etc., are used in order to establish and/or maintain copies of data on different cluster sites of a clustered file system. These copies of data are sometimes referred to as duplicate copies of data, which may be used as a backup, e.g., for recovery in case a cluster of the clustered file system and/or a duplicate copy stored thereon becomes compromised.

Clustered file system configurations may depend on the approach. For example, in some approaches, a clustered file system may include one or more Network File System (NFS) servers, which may include underlying file system(s). Moreover, as will be described in further detail elsewhere herein, a clustered file system may include one or more local clusters, e.g., a production cluster, a primary cluster, etc., and/or one or more remote clusters, e.g., a cloud cluster, a backup cluster, etc. For example, customers often rely on options that practice backing up a subset of data from a data center to a cloud center, e.g., for analytics sake, and thereafter being able to retrieve such files.

During replication within some clustered file systems, e.g., such as replication from some on-premise cluster sites to cloud-based storage solutions, cloud solutions are not able to generate reliable inode numbers and ergo consistent file handles. More specifically, this unreliability may occur subsequent to one or more clusters and/or components therein of a clustered file system becoming at least temporarily nonfunctional. As a result of such system downtime, a queue, e.g., an in-memory queue, of the on-prem storage site may experience a failure event. Failure events of the queue may result in a complete loss of the queue of operations, e.g., rename and/or remove operations on remote objects, that were scheduled to be performed asynchronously to the remote cloud storage site.

In some approaches, replication solutions may be performed subsequent to a queue of an on-prem storage site experiencing a failure event in order to identify operations that have previously been performed on a production cluster site but that have not yet been performed on a replication cluster site. In such an example, note that such operations may have existed as an entry within the queue prior to the failure event, however, subsequent to the failure event are unknown. In order to recover from a queue failure event, remote inode numbers of the production cluster site may be compared against the inode numbers of the remote cluster site in order to determine which files have previously been removed and/or renamed one a first of the cluster sites but not yet reflected on the second cluster site. However, this approach may not prove effective within cloud-based storage sites, as cloud-based storage sites do not generate reliable inode numbers that can be used in order to perform a comparison on the production cluster site.

A more specific approach for recovering from a queue failure event may include determining a previous name of a given inode in addition to a most current name of the inode from a header, e.g., dirent, on a directory of the inode. In some approaches, this may be achieved based on a predetermined bit on a parent directory of the inode being set in response to the inode being renamed or removed. For example, this may include reusing an existing set of bits reserved on the inode for replication. Thereafter during recovery from a queue failure event, e.g., assume in the current example that the failure event has occurred on a local production cluster site, in order to determine pending rename and/or and remove objects that have not yet been reflected on a remote cluster site, and additionally the original names of such objects, a policy scan may be performed in order to query directories having a marked dirty bit. For context, in some approaches, a directory containing a dirty bit may translate to the directory containing a pending rename operation or a pending remove operation which has been performed on the local production cluster site, but has not yet been replicated on the remote cluster site. Upon determining directories having a marked dirty bit, entries of the directories containing the marked dirty bits may be listed at both the production cluster site and the remote cluster site. Thereafter, the lists may be sorted in order of the remote inode numbers, and an entry by entry comparison may be performed by matching the remote inode number as a key. However, this technique for recovering from a queue failure event may be time consuming as in some approaches for example, hundreds of thousands, if not more, dirty directories may exist. To complicate matters, the directories may contain millions of entries therein of which the remove and/or rename entries are to be identified.

In some approaches a potential workaround for recovering from a queue failure event includes completely resyncing a production site cluster over to the remote site and sorting out differences in order to synchronize the objects of the different cluster sites. However, this workaround consumes a considerable amount of processing resources of a data storage system during the relatively time consuming resync process. It should be noted that in some approaches, during the recovery process (in which it is determined which remove and/or rename operations have been performed on a production cluster site but have yet to be reflected on a remote cluster site), one or more additional remove and/or rename operations may populate the queue of the production site cluster. In one or more of such approaches, assuming that entries of the queue are lost due to a node failure occurring and/or memory pressure, recovery therefrom is further complicated as more dirty directories are added to a list of directories that are to be processed, e.g., via scanning, to determine rename and remove operations.

Various embodiment and approaches described herein include using a modified extended attribute of a file for enabling relatively efficient recovery of a clustered file system from a queue failure event. Note that, as will be described elsewhere herein, such use of modified extended attribute(s) enables recovery of the clustered file system from a queue failure event using magnitudes fewer processing resources and time than would otherwise be consumed using conventional techniques described elsewhere above.

Figure 4A:
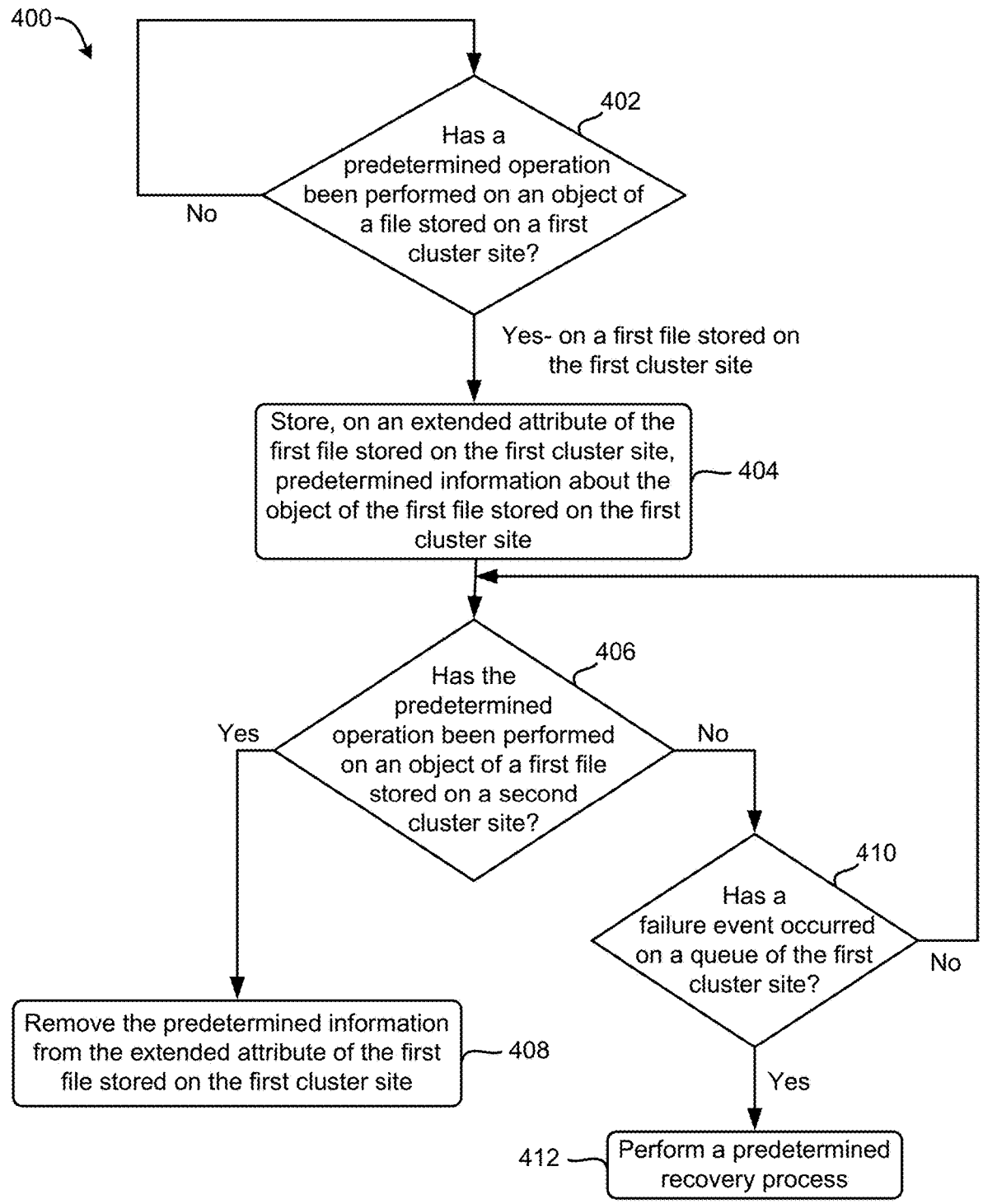
FIG. 4A is a flowchart of a method, in accordance with one embodiment.

Now referring to FIG. 4A, a flowchart of a method 400 is shown according to one embodiment. The method 400 may be performed in accordance with the present invention in any of the environments depicted in FIGS. 1-3, 4B-4C and 5-9, among others, in various embodiments. Of course, more or fewer operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that in some approaches method 400 may be performed within any type of environment that includes a plurality of cluster sites, e.g., a first cluster site, a second cluster site, a tenth cluster site, etc. As will now be described in various approaches herein, in some non-limiting examples, method 400 may be performed within any known type of clustered file system environment. For example, according to one non-limiting example, the file system may be an IBM SPECTRUM SCALE® filesystem by IBM.

The clustered file system environment of the present embodiment includes at least a first cluster site and a second site. The first cluster site may be any known type of cluster site, e.g., a production cluster site, a primary cluster site, a replication site of an associated cluster site, a disaster recovery (DR) cluster site, a cluster used as a migration/backup destination, etc. Similarly, the second cluster site may be any known type of cluster site. For purposes of a non-limiting example, various descriptions herein may be made with respect to the first cluster site being a production cluster site, e.g., a primary cluster site, a local cluster site, etc., and the second cluster site being a remote cluster site e.g., a replication cluster site, a DR cluster site, a cluster site used as a migration/backup destination, etc.

In some approaches, each object of a first file stored on the second cluster site may be associated with a respective object of a first file stored on the first cluster site, e.g., objects of the second cluster site may be associated with a respective object of the first cluster site. Accordingly, in one or more of such approaches, actions, e.g., deletions of, additions to, renaming of, etc., performed on objects of files stored on the first cluster site may preferably be replicated on respectively associated objects of files stored on the second cluster site. Accordingly, in an event that objects of files stored on the first cluster site ever become inadvertently non-accessible, e.g., lost as a result of an error event occurring on the first cluster site, a most recently updated copy of the non-accessible objects may be available on the second cluster site.

Note that a "first file" is not intended to be limited to a file that is temporally stored first on the first cluster site and/or the second cluster site, but rather a term used to describe any file of the first cluster site and/or the second cluster site.

Some cluster sites of the clustered file system environment may in some approaches be provisioned with relatively more hardware capabilities than other cluster sites of the clustered file system environment. For example, in one approach the first cluster site may be a production cluster site that is provisioned with relatively greater hardware capabilities than the second cluster site which may be a remote cluster site. The configuration of such an approach may be constructed in anticipation that an application load generated at the second cluster site may be less than an application load generated at the first cluster site. However, in some approaches, the second cluster site may have a storage capacity that is about equal to the storage capacity of the first cluster site. Moreover, depending on the approach, the first cluster site and/or the second cluster site may include a plurality of servers, e.g., network file system (NFS) servers.

Decision 402 of method 400 includes determining whether a predetermined operation has been performed on an object of a file stored on the first cluster site of the clustered file system environment, e.g., a first file. The predetermined operation may include any known type of operation that may be performed on a file system. For example, according to various approaches, the predetermined operation may include, e.g., a renaming of an object, a removing of an object, a known operation for inspecting an object, etc. A determination of whether the predetermined operation has been performed on an object of a file stored on the first cluster site of the clustered file system environment may be performed using any one or more known techniques.

For contextual purposes, it should be noted that the predetermined operation may be one of a plurality of predetermined operations that are being monitored for. Moreover, it should be noted that depending on the approach, the determination may be performed with respect to any one or more objects of any one or more files stored on the first cluster site.

At any time, in response to determining that the predetermined operation has not been performed on an object of a file stored on the first cluster site, e.g., as indicated by the "No" logical path of decision 402, monitoring may continue to be performed for determining whether a predetermined operation has been performed on an object of a file stored on the first cluster site.

In some approaches, in response to determining that the predetermined operation has not been performed on an object of a file stored on the first cluster site, e.g., which may for purposes of an example may hereafter be referred to as "the object of the first file stored on the first cluster site," an operation may be performed in order to note that the predetermined operation has been performed. The predetermined operation may have been performed on the object of the first file stored on the first cluster site with the anticipation that the operation also be performed on an associated object of a file of a different cluster site, e.g., which may for purposes of an example hereafter referred to as "the object of the first file stored on the second cluster site." For example, the first file stored on the second cluster site may be an ongoingly updated copy of the first file stored on the first cluster site, e.g., a replication copy, a mirrored copy, a redundant copy, an archive copy, etc.

According to some preferred approaches, an operation may be performed to note that the predetermined operation has been performed on the object of the first file stored on the first cluster site. For context, the operation may thereby queue that the predetermined operation is to also be performed on the object of the first file stored on the second cluster site. An operation performed to note that the predetermined operation has been performed on the object of the first file stored on the first cluster site may include storing predetermined information on an extended attribute of the first file stored on the first cluster site, e.g., see operation 404 of method 400. In some approaches, at least some of the information stored on the extended attribute of the first file stored on the first cluster site may be stored as metadata of an inode of the extended attribute.

The predetermined information stored on the extended attribute of the first file stored on the first cluster site may depend on what the type of predetermination that was determined to have been performed on the object of the first file stored on the first cluster site. For example, in some approaches the predetermined operation determined to have been performed may be a remove operation. In one or more of such approaches the predetermined information stored on the extended attribute may include a current name of the object of the first file stored on the first cluster site. According to some other approaches, the predetermined operation determined to have been performed may be a rename operation. In one or more of such approaches the predetermined information stored on the extended attribute may include a previous name of the object of the first file stored on the first cluster site and/or a parent inode number from which the object of the first file stored on the first cluster site is being renamed.

In some approaches, the predetermined information stored on the extended attribute of the first file stored on the first cluster site may additionally and/or alternatively depend on a size of the current name of the object of the first file stored on the first cluster site. For example, according to one or more of such approaches, assuming that the predetermined operation determined to have been performed is remove operation, in response to a determination that the size of the current name of the object of the first file stored on the first cluster site is greater than a predetermined threshold, e.g., 1 byte, 10 bytes, 64 bytes, etc., a fold value of the file that contains the object may be additionally and/or alternatively stored on the extended attribute of the first file stored on the first cluster site.

Subsequent to determining that a predetermined operation has been performed on an object of the first file stored on a first cluster site, method 400 may optionally include one or more operations for ensuring that the predetermined operation is performed on an associated object of a file stored on the second cluster site. For example, according to one approach, method 400 may include determining whether the predetermined operation has been performed on an object of a first file stored on a second cluster site, e.g., see decision 406 of method 400.

In one approach, in response to a determination that the predetermined operation is performed on an object of the first file stored on a second cluster site, the predetermination information may be removed from the extended attribute of the first file stored on the first cluster site, e.g., see operation 408 of method 400. According to one specific approach, assuming that the predetermined operation is a remove operation, removing the predetermined information from the extended attribute may include removing the current name of the object from the extended attribute of the first file stored on the first cluster site. In such an approach, the current name of the object may be removed from the extended attribute of the first file stored on the first cluster site because the predetermined operation being performed on the object of the first file stored on a second cluster site may infer that a successful mirroring of the predetermined operation has been performed on both the first cluster site and the second cluster site. However, as will now be described below, in some approaches, it may be determined that the predetermined operation fails to occur on the object of the first file stored on the second cluster site.

In some approaches, method 400 may include monitoring for occurrence of one or more known types of failure events on the first cluster site and/or on the second cluster site. Such monitoring may be performed using one or more known techniques. The failure events may be any one or more known types of failure events on any portion of the first cluster site and/or on the second cluster site. For example, in some approaches a failure may be determined to occur on a queue, e.g., an in-memory queue, of the first cluster site. Note that depending on the approach, the failure event may occur prior to entries of the queue being output to the second cluster site. A failure event of a queue may occur as a result of one or more events occurring, e.g., a power loss event, a data loss event, an unintentional clearing of the queue, etc., and may in some approaches result in entries of the queue being lost. Such entries in the queue may correspond to operations that were previously performed on objects of files stored on the first cluster site that have not yet been replicated to associated objects of files stored on the second cluster site. Accordingly, a loss of pending queue entries may result in one or more operations performed on objects of files stored on the first cluster site not being replicated to associated objects of files stored on the second cluster site, or vice versa. Decision 410 of method 400 includes determining whether a failure event has occurred on a queue of the first cluster site.

In response to a determination that a failure event has not occurred on a queue of the first cluster site, e.g., as indicated by the "No" logical path of decision 410, monitoring for a failure event and/or monitoring for performance of the predetermined operation on the object of the first file stored on the second cluster site may be performed, e.g., see the "No" logical path of decision 410 return to decision 406. Of course, performance of decision 406 and/or decision 410 may be performed irrespective of one another at any time and in any ordering if at all. For example, in one alternate approach, method 400 may include monitoring only for occurrence of a failure event, after detection of which it may be determined whether the one or more operations performed on an object of a file stored on the first cluster site have been performed on an object of a file stored on the second cluster site.

In response to a determination that a failure event has occurred on a queue of the first cluster site, e.g., as indicated by the "Yes" logical path of decision 410, a predetermined recovery process may be performed, e.g., see operation 412 of method 400. In some approaches, the predetermined recovery process may be implemented as a preconfigured policy. In one or more of such approaches, the preconfigured policy may be configured such that it is run one or more nodes which may already be active subsequent failure of the queue.

The particular recovery process performed in response to determining that a failure has occurred may depend on a resulting state of the clustered file system environment after the failure event. For example, in some approaches, failure events that occur on a queue may result in a loss of entries that existed in the queue prior to the failure event occurring. More specifically, in one or more of such approaches, entries that correspond to operations that were previously performed on objects of files stored on the first cluster site and that have not yet been replicated on respectively associated objects of files stored on the second cluster site may be lost as a result of the occurrence of the failure event. Accordingly, performing the predetermined recovery process preferably thereby enables fulfillment of entries of the queue of the first cluster site. For example, as will be elsewhere below, e.g., see FIGS. 4B-4C, in some approaches, such enablement may be at least in part enabled by recovery of the queue entries and/or performance of recovered queue entries.

Looking to FIGS. 4B-4C, exemplary sub-operations of performing a predetermined recovery process are illustrated in accordance with various embodiments, one or more of which may be used to perform operation 412 of FIG. 4A. However, it should be noted that the sub-operations of FIGS. 4B-4C are illustrated in accordance with various embodiments which are in no way intended to limit the invention.

Referring first to FIG. 4B, as indicated elsewhere above, in some approaches the predetermined operation may be a remove operation. Accordingly, in one or more of such approaches an entry of the queue that is lost as a result of the failure event may correspond to the remove operation. Performing the predetermined recovery process may in one or more of such approaches include determining files stored on the first cluster site having a respective extended attribute that includes a current name of an object stored thereon, e.g., see sub-operation 422. In some approaches, entries may be added to the queue of the of the first cluster site for files of the first cluster site determined to have a respective extended attribute that includes predetermined information stored thereon, e.g., a current name of an object. Sub-operation 424 includes outputting an instruction to perform the remove operation on objects of files stored on the second cluster site that are associated with objects of the files stored on the first cluster site that are determined to have a respective extended attribute that includes a current name of an object stored thereon. Depending on the approach, method 400 may include aggregating a predetermined number of entries in the recovered queue before outputting instructions for performing operations on objects of files stored on the second cluster site. In another approach, the output instructions may additionally and/or alternatively include a predetermined time, e.g., system downtime, for performing one or more of the operations to be performed on objects of files stored on the second cluster site, e.g., in order to prevent a sudden flux in processing resources being consumed on the second cluster site. Subsequent to the remove operation being performed on objects of files stored on the second cluster site, the current name of the object may be removed from the extended attribute of the first file stored on the first cluster site.

It should be noted that storing predetermined information to a respective extended attribute of a file for ensuring that operations performed on an object of a file stored on a first cluster site are replicated to an object of a file stored on a second cluster site is a process that has heretofore not been considered. Instead, as described elsewhere above, subsequent to experiencing failure of a queue on a cluster site, conventional techniques resort to performing a time consuming and processing resource constraining process of: performing a policy scan for querying directories having a marked dirty bit, listing entries of the directories containing the marked dirty bits at both the production cluster site and the remote cluster site, sorting the lists in order of remote inode numbers, and performing an entry by entry comparison by matching the remote inode number as a key. In sharp contrast, inventors have calculated that using various novel embodiments and/or approaches described herein for recovering from a queue failure event in a clustered file system environment enables up to a 4×-5× performance increase over the above-mentioned time and resource consuming process that includes performing a policy scan for querying directories having a marked dirty bit. Accordingly, the inventive discoveries disclosed herein proceed contrary to conventional wisdom.

Referring now to FIG. 4C, in some approaches the predetermined operation performed on the object of the first file stored on the first cluster site may be a rename operation. Accordingly, in some approaches an entry of the queue that is lost as a result of the failure event may correspond to the rename operation. Performing the predetermined recovery process may in one or more of such approaches include determining files stored on the first cluster site having a respective extended attribute that includes a previous name of the object of the first file stored on the first cluster site and/or a parent inode number from which the object of the first file stored on the first cluster site is being renamed stored thereon, e.g., see sub-operation 426. Sub-operation 428 includes outputting an instruction to perform the rename operation on objects of files stored on the second cluster site that are associated with objects stored on the first cluster site that are determined to have a respective extended attribute that includes a previous name of the object of the first file stored on the first cluster site and/or a parent inode number from which the object of the first file stored on the first cluster site is being renamed stored thereon. According to a more specific approach, an instruction to perform the rename operation may include an instruction to rename each of the objects of files stored on the second cluster site that are associated with objects of the determined files stored on the first cluster site to a predetermined previous name of an associated object of the determined files stored on the first cluster site. For example, the instruction to perform the rename operation may include a sub-instruction for renaming each of the objects of files stored on the second cluster site that are associated with objects of the determined files stored on the first cluster site to a relatively oldest name of an associated object of the determined files stored on the first cluster site. Subsequent the rename operation being performed on objects of files stored on the second cluster site, the predetermined information may be removed from the extended attribute of the first file stored on the first cluster site.

With general reference again to operation 412 of FIG. 4A, in some approaches, the predetermined recovery process may be performed at a predetermined time. For example, the predetermined recovery process may be performed during downtime of the second cluster site as a result of the occurrence of the failure event. Such an approach further distinguishes various embodiments and approaches described herein from conventional techniques for recovering from occurrence of a failure event on a queue. This is because recovery from a queue failure event in some conventional techniques requires both cluster sites, e.g., a production cluster site and remote cluster site, to be functional. However, in sharp contrast, the predetermined recovery process may be utilized with only the cluster site having the queue being functional, e.g., the first cluster site in method 400.

Various embodiments below will now detail illustrative interactions, e.g., communication exchanges, between a first cluster site and a second cluster site for enabling recovery from a clustered file system queue failure event using a modified extended attribute of a file, e.g., see FIGS. 5-9.

FIGS. 5-9 depict cluster file system environments 500, 600, 700, 800, 900, in accordance with one embodiment. As an option, the present cluster file system environments 500, 600, 700, 800, 900 may be implemented in conjunction with features from any other embodiment listed herein, such as those described with reference to the other FIGS. Of course, however, such cluster file system environments 500, 600, 700, 800, 900 and others presented herein may be used in various applications and/or in permutations which may or may not be specifically described in the illustrative embodiments listed herein. Further, the cluster file system environments 500, 600, 700, 800, 900 presented herein may be used in any desired environment.

As will be described below, the cluster file system environments 500, 600, 700, 800, 900 are each configured to overcome the limitations posed by conventional cloud object storage file systems which as described elsewhere herein includes not being able to generate reliable inode numbers. This is because, as described elsewhere above, many conventional cluster file system environments depend on remote inode numbers to form a framework of a time consuming and processing resource consuming recovery procedure in which pending remove and rename operations that may have been lost are recovered. However, such conventional techniques solely rely on the directory contents of dirty directories at both the production site and the backup/DR site.

In sharp contrast, as will be described below, several illustrative operations may be performed within the cluster file system environments 500, 600, 700, 800, 900 to enable a relatively more efficient recovery process. For example, various approaches described herein may include storing the name of an object on an extended attribute of a file in response to a predetermined operation being performed on the object. This is important because, although the distributed file system retains the inode of a deleted object in a remove operation performed on an object, there may be no name associated with it because the dentry on the corresponding directory's inode is removed and hence there is no way to retain its name. Accordingly, information such as the current name of the object may be stored on an extended attribute of the object, which in turn is stored on its inode itself and hence is retained as is.

Figure 5:
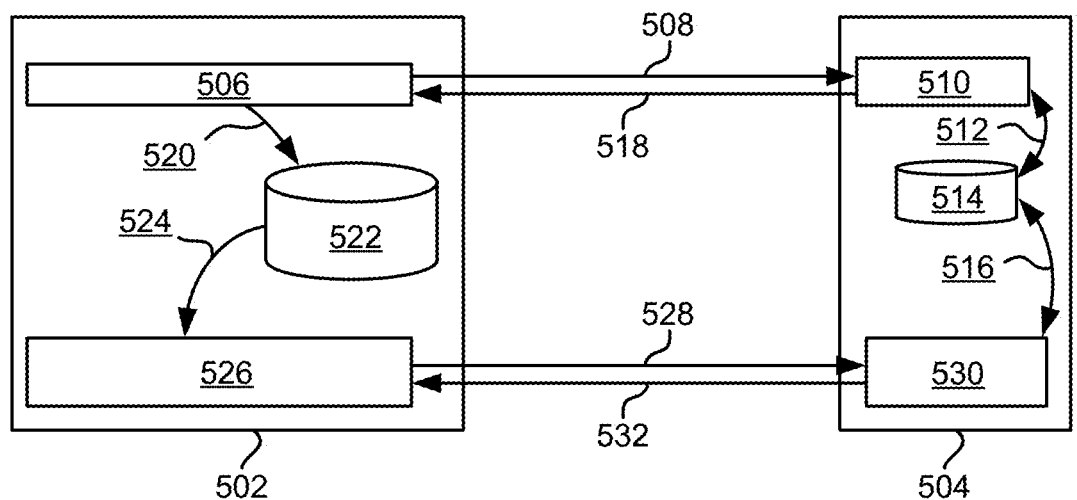
FIG. 5 is a representative diagram of cluster sites in a data storage environment, in accordance with one embodiment.

Referring first to FIG. 5, the cluster file system environment 500 includes a first cluster site 502 and a second cluster site 504.

Operation 506 includes performing a create operations for a file, e.g., a testFile. This create operation may be output by the first cluster site 502 for replicating on the second cluster site 504, e.g., see operation 508. The create operation is received by the second cluster site 504 in operation 510. An acknowledgement may be output, e.g., see operation 518, by the second cluster site 504 to the first cluster site 502 subsequent to the file, e.g., testFile, being created on the second cluster site 504. Moreover, subsequent to the file being created on the second cluster site 504, I/O operations may be performed to the cloud file system 514, e.g., see operation 512.

Operation 520 includes storing information, e.g., a local name of a file and parent inode number of the file, a fold value, etc., to an extended attribute for the inode 522. Thereafter, the extended attribute may be retrieved to frame a complete path of a file at the second cluster site 504, e.g., see operation 524. For example, operation 526 includes performing a write operation on the same file, i.e., the testFile. An instruction to perform a write operation using a complete path of the file framed may be output to the second cluster site 504, e.g., see operation 528. Upon receiving the instruction, write operations may be performed on the file by the second cluster site 504. For example, one or more I/O operations may be performed to the cloud file system 514 of the second cluster site 504, e.g., see operation 516. An acknowledgement of one or more successful write operations being performed, e.g., see operation 530, may be output by the second cluster site 504 and received by the first cluster site 502, e.g., see operation 532.

Figure 6:
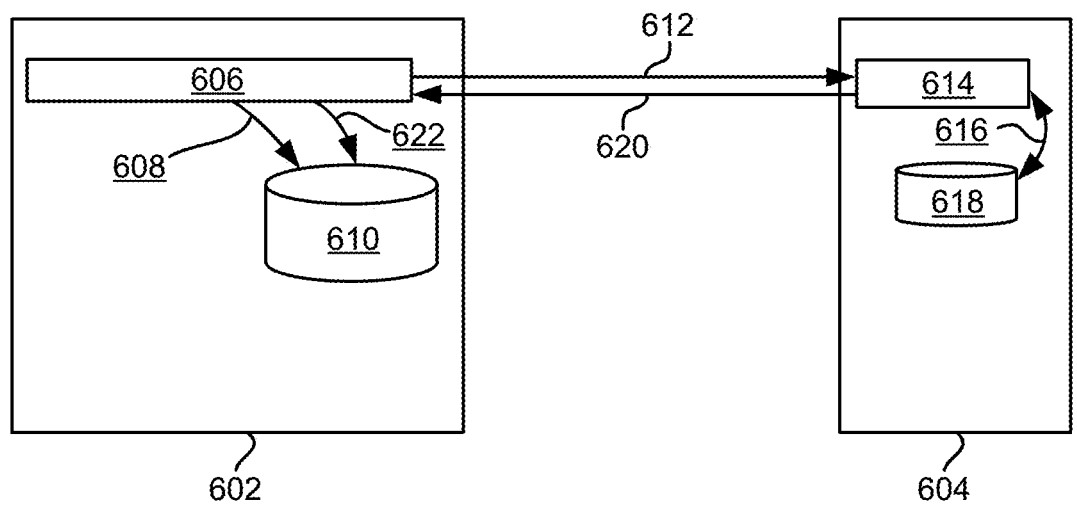
FIG. 6 is a representative diagram of cluster sites in a data storage environment, in accordance with one embodiment.

Referring now to FIG. 6, the cluster file system environment 600 includes a first cluster site 602 and a second cluster site 604. In response to determining that a predetermined operation has been performed on an object of a first file stored on the first cluster site 602, predetermined information may be stored on an extended attribute 610 of the first file stored on the first cluster site 602, e.g., see operation 608. For purposes of an example, in the current approach it may be assumed that the predetermined operation includes performing a remove operation, e.g., testFile remove, on the object of the first file stored on the first cluster site 602, e.g., see operation 606. Moreover, it may be assumed in the current example that the information includes a current name of the object of the first file stored on the first cluster site 602.

FIG. 6 illustrates an approach in which the remove operation performed on the first cluster site 602 is successfully replicated to the second cluster site 604. For example, in operation 612, an instruction is output, e.g., from a queue of the first cluster site 602 to the second cluster site 604, to perform the remove operation on the second cluster site 604. Subsequent to receiving the instruction, the remove operation is performed on an associated object of a file stored on the second cluster site 604, e.g., see operation 614. I/O operations may be performed to a cloud file system 618, e.g., see operation 616.

In response to a determination that the predetermined operation is performed on the object of the first file stored on the second cluster site 604 the extended attribute that is set along with the object's inode that is left over is removed. In one approach such a determination may be made in response to receiving an acknowledgement that the predetermined operation has been performed on the object of the first file stored on the second cluster site 604, e.g., see operation 620. Operation 622 includes removing the current name of the object from the extended attribute of the first file stored on the first cluster site 602, e.g., see operation 622.

Figure 7:
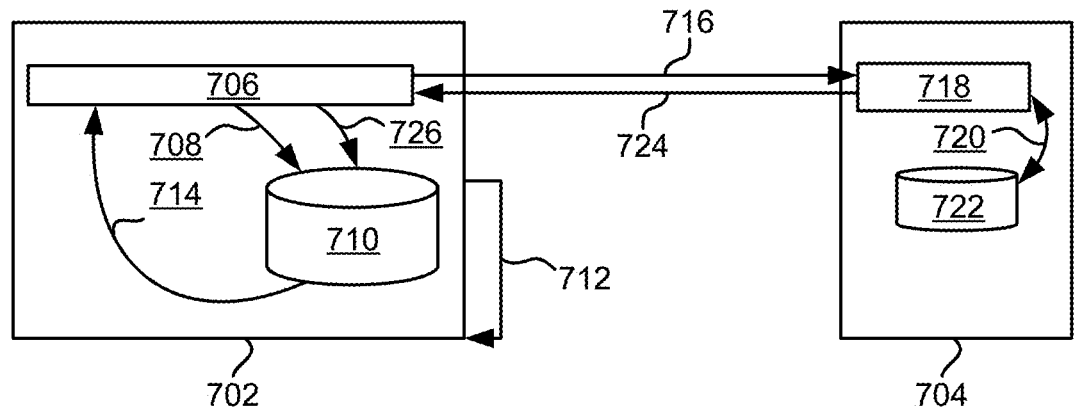
FIG. 7 is a representative diagram of cluster sites in a data storage environment, in accordance with one embodiment.

Referring now to FIG. 7, the cluster file system environment 700 includes a first cluster site 702 and a second cluster site 704. In response to determining that a predetermined operation has been performed on an object of a first file stored on the first cluster site 702, information may be stored on an extended attribute 710 of the first file stored on the first cluster site 702, e.g., see operation 708. For purposes of an example, in the current approach it may be assumed that the predetermined operation includes performing a remove operation, e.g., testFile remove, on the object of the first file stored on the first cluster site 702, e.g., see operation 706. Moreover, it may be assumed in the current example that the information includes a current name of the object of the first file stored on the first cluster site 702. FIG. 7 illustrates an approach in which the remove operation performed on the first cluster site 702, as a result of a failure event occurring on a queue of the first cluster site 702, is not initially successfully replicated to the second cluster site 704. For example, the queue of the first cluster site 702 may experience a failure event, e.g., due to a node failure event, due to a site going down, etc., e.g., see operation 712.

In response to determining that the queue failure event has occurred, a predetermined recovery process may be performed in order to determine entries of pending operations that have not yet been performed on the second cluster site 704, e.g., such as the pending remove operation in the current approach. In some approaches predetermined recovery process includes running predetermined relevant policies configured to determine updates that were missed from playing on the second cluster site 704. For example, in the current approach, one or more of such policies may be configured to determine that the pending remove operation has not yet been performed on the second cluster site 704 by determining as a result of running such policies, files that have predetermined information stored on an associated extended attribute. An object of the second cluster site 704 may be determined and listed from the extended attribute, which thereby may be used to instruct the object to be removed on the second cluster site 704. More specifically, as illustrated in FIG. 7, during the predetermined recovery process, the extended attribute of the object of the first file stored on the first cluster site 702 may be removed, e.g., see operation 714. Thereafter, the remove extended attribute may be retrieved and queued for the file of which the remove operation was not performed as a result of the failure event, e.g., see operation 716.

Subsequent to receiving a remove operation instruction from the first cluster site 702, the second cluster site 704 may remove a file having an associated object stored thereon, e.g., see operation 718. For example, in some approaches the remove process may include performing I/O operations to a file system 722 of the second cluster site 704, e.g., see operation 720.

An acknowledgement of the remove operation being performed on the second cluster site 704 may be output from the second cluster site 704 and received from by the first cluster site 702, e.g., see operation 724. Thereafter, in some approaches the information previously stored on the extended attribute of the first file stored on the first cluster site 702 may be removed, e.g., see operation 726.

Figure 8:
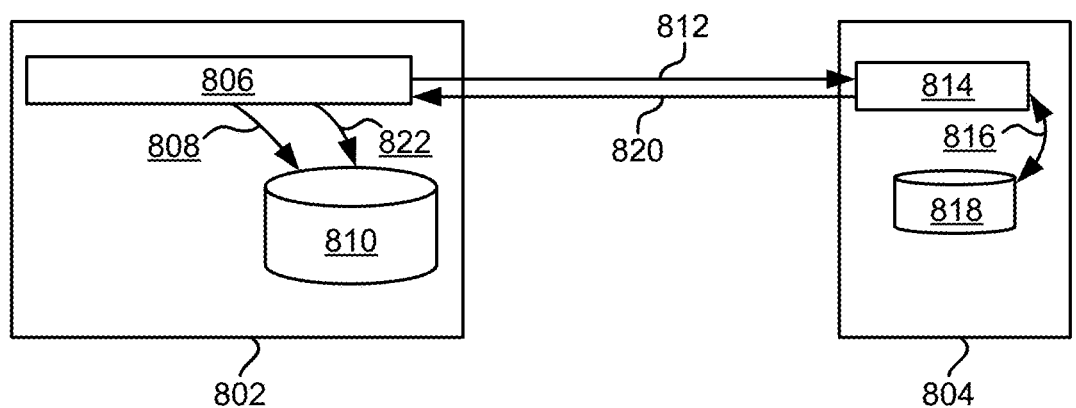
FIG. 8 is a representative diagram of cluster sites in a data storage environment, in accordance with one embodiment.

Referring now to FIG. 8, the cluster file system environment 800 includes a first cluster site 802 and a second cluster site 804. In response to determining that a predetermined operation has been performed on an object of a first file stored on the first cluster site 802, predetermined information may be stored on an extended attribute 810 of the first file stored on the first cluster site 802, e.g., see operation 808. For purposes of an example, in the current approach it may be assumed that the predetermined operation includes performing a rename operation, e.g., testFile to renametestFile, on the object of the first file stored on the first cluster site 802, e.g., see operation 806. Moreover, it may be assumed in the current example that the information includes a previous name of the object of the first file stored on the first cluster site and/or a parent inode number from which the object of the first file stored on the first cluster site is being renamed. This is important because, although a distributed filesystem may retain the inode of the renamed object, the name of the object obtains the new renamed name on the object's new parent directory's inode. Accordingly, the current name of the object may be utilized as the predetermined information that is stored in the extended attribute of the object, which in turn is stored on its inode itself.

In operation 812 an instruction is successfully output from the first cluster site 802 to cause the rename operation to be performed on the second cluster site 804.

Subsequent to receiving the instruction on the second cluster site 804, the rename operation may be performed on an associated object of a file stored on the second cluster site 804, e.g., see operation 814. Note that in some approaches, the instruction for performing the rename operations and/or the performed rename operation may be directed to one or more objects that exist on a plurality of directories of the second cluster site 804. I/O operations may be performed to a cloud file system 818, e.g., see operation 816.

In response to a determination that the predetermined operation is performed on the object of the first file stored on the second cluster site 804 the predetermined information is removed from the extended attribute of the object of the first file stored on the first cluster site 802, e.g., see operation 822. In one approach such a determination may be made in response to receiving an acknowledgement that the predetermined operation has been performed on the object of the first file stored on the second cluster site 804, e.g., see operation 820.

Figure 9:
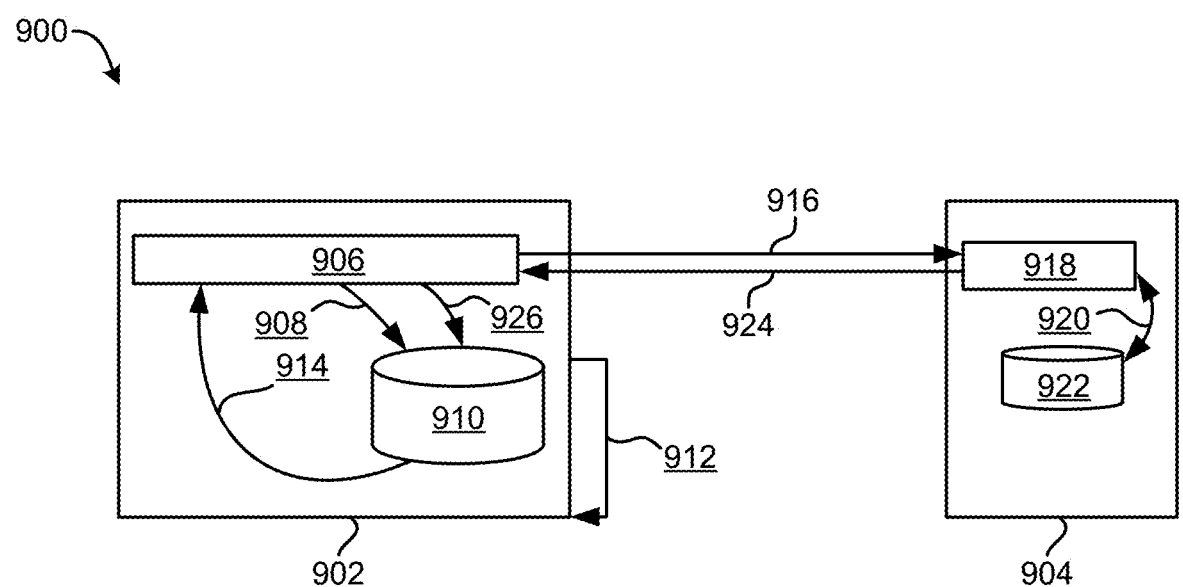
FIG. 9 is a representative diagram of cluster sites in a data storage environment, in accordance with one embodiment.

Referring now to FIG. 9, the cluster file system environment 900 includes a first cluster site 902 and a second cluster site 904. In response to determining that a predetermined operation has been performed on an object of a first file stored on the first cluster site 902, information may be stored on an extended attribute 910 of the first file stored on the first cluster site 902, e.g., see operation 908. For purposes of an example, in the current approach it may be assumed that the predetermined operation includes performing a rename operation, e.g., testFile to renametestFile, on the object of the first file stored on the first cluster site 902, e.g., see operation 906. Moreover, it may be assumed in the current example that the information includes a previous name of the object of the first file stored on the first cluster site 902 and/or a parent inode number from which the object of the first file stored on the first cluster site 902 is being renamed. FIG. 9 illustrates an approach in which the rename operation performed on the first cluster site 902, as a result of a failure event occurring on a queue of the first cluster site 902, is not initially successfully replicated to the second cluster site 904. For example, the queue of the first cluster site 902 may experience a failure event, e.g., due to a node failure event, due to a site going down, etc., e.g., see operation 912.

In response to determining that the queue failure event has occurred, a predetermined recovery process may be performed in order to determine entries of pending operations that have not yet been performed on the second cluster site 904, e.g., such as the pending rename operation in the current approach. In some approaches predetermined recovery process includes running predetermined relevant policies configured to determine updates that were missed from playing on the second cluster site 904. For example, in the current approach, one or more of such policies may be configured to determine that the pending rename operation has not yet been performed on the second cluster site 904 by determining as a result of running such policies, files that have predetermined information stored on an associated extended attribute. This may be achieved by obtaining a previous parent inode of objects of files that have predetermined information stored on an associated extended attribute, and obtaining the full path of the previous object. More specifically, as illustrated in FIG. 9, during the predetermined recovery process, the extended attribute of the object of the first file stored on the first cluster site 902 may be renamed, e.g., see operation 914. Thereafter, the rename extended attribute may be retrieved and queued for the file of which the rename operation was not performed as a result of the failure event, e.g., see operation 916.

Subsequent to receiving a rename operation instruction from the first cluster site 902, the second cluster site 904 may rename a file stored thereon, e.g., see operation 918. For example, in some approaches the rename process may include performing I/O operations to a file system 922 of the second cluster site 904, e.g., see operation 920.

An acknowledgement of the remove operation being performed on the second cluster site 904 may be output from the second cluster site 904 and received from by the first cluster site 902, e.g., see operation 924. Thereafter, in some approaches the information previously stored on the extended attribute of the first file stored on the first cluster site 902 may be removed, e.g., see operation 926. In some approaches, multiple rename operations may be performed back to back on the same object. In one or more of such approaches, in response to a determination that the extended attribute storing the oldest name of the object exists, the extended attribute may be left out as such so that the oldest name of the object is available during a recovery process. In one approach, the oldest name of the object may be included in the extended attribute. In some other approaches the oldest name of the object may be excluded from the extended attribute. In one or more of such approaches the oldest name of the object may be stored, e.g., on the first cluster site 902.

Various embodiments and approaches described herein include descriptions detailing the benefits, e.g., preservation of processing potential, relative efficiencies, downtime capabilities, etc., enabled as a result of using a modified extended attribute of a file for recovery from a clustered file system queue failure event. Various descriptions below describe additional realized benefits.

In some approaches, various embodiments and approaches described herein enable a potential for handling complex Portable Operating System Interface (POSIX) operations in a recovery and/or failure path while replicating to a remote cluster site such as to cloud storage as a backup, with relative ease.

Moreover, as described elsewhere above, conventional clustered data storage systems often include a complex process for recovering from a queue failure event. In sharp contrast, embodiments and approaches described herein include a relatively streamlined process for determining after occurrence of a queue failure event on a production cluster site, pending operations that have not yet been performed on a remote cluster site. This is at least in part because conventional systems employ an exhaustive method of comparing a remote inode number of each object in the directory with its remote counterpart before arriving at the original name of the given object. In sharp contrast, techniques of various embodiments and approaches described herein streamline the recovery process by storing and utilizing modified extended attributes to recover from a queue failure event, which as described elsewhere herein boosts the recovery time of existing replication and disaster recovery models by at least 2× to 5× or more.

Utilizing embodiments and approaches described herein moreover results in the avoided reliance on extensive dirty directory comparisons for generating pending remove and/or rename operations within a queue subsequent a queue failure event. This is beneficial because such reliance may otherwise impact customers in a regular active file management and/or active file management disaster recovery scenario. Instead, such recovery is simplified to being determined in a manner in which other operations may be determined, e.g., create, write, setAttr, etc. Again, this greatly increases performance and efficiency within existing as well as new replication scenarios. This increase in performance and efficiency is particularly realized in customer scenarios, as conventional techniques for recovering from a queue failure event typically utilizes a major portion of compute cycles, e.g., CPU utilization is known to almost always report a utilization of 100% by the filesystem daemon utilizing such conventional techniques.

Various embodiments and approaches described herein may in some approaches allow underlying structures of conventional clustered data storage systems to be kept constant, thereby ensuring backward compatibility to already deployed customers. Of course, such systems may preferably be modified to function according to one or more embodiments and/or approaches described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   in response to a determination that a predetermined operation has been performed on an object of a first file stored on a first cluster site, storing, on an extended attribute of the first file stored on the first cluster site, predetermined information about the object of the first file stored on the first cluster site;
   in response to a determination that the predetermined operation is performed on an object of a first file stored on a second cluster site, removing the predetermined information from the extended attribute of the first file stored on the first cluster site; and
   in response to a determination that a failure event has occurred on a queue of the first cluster site, performing a predetermined recovery process thereby enabling fulfillment of entries of the queue of the first cluster site that were lost from the queue of the first cluster site as a result of the occurrence of the failure event,
   wherein performing the predetermined recovery process includes determining files stored on the first cluster site having a respective extended attribute that includes the predetermined information,
   wherein dirty directory comparisons are not relied on for determining the files stored on the first cluster site.

2. The computer-implemented method of claim 1, wherein the predetermined operation is a remove operation, wherein the predetermined information includes a current name of the object of the first file stored on the first cluster site.

3. The computer-implemented method of claim 2, wherein performing the predetermined recovery process includes:
   outputting an instruction to perform the remove operation on objects of files stored on the second cluster site that are associated with objects of the determined files stored on the first cluster site.

4. The computer-implemented method of claim 1, wherein the predetermined operation is a rename operation, wherein the predetermined information includes a previous name of the object of the first file stored on the first cluster site and/or a parent inode number from which the object of the first file stored on the first cluster site is being renamed.

5. The computer-implemented method of claim 4, wherein performing the predetermined recovery process includes:
   outputting an instruction to perform the rename operation on objects of files stored on the second cluster site that are associated with objects of the determined files stored on the first cluster site.

6. The computer-implemented method of claim 5, wherein the instruction to perform the rename operation includes a sub-instruction for renaming each of the objects of files stored on the second cluster site that are associated with objects of the determined files stored on the first cluster site to a relatively oldest name of an associated object of the determined files stored on the first cluster site.

7. The computer-implemented method of claim 1, wherein the first file stored on the second cluster site is an ongoingly updated copy of the first file stored on the first cluster site.

8. The computer-implemented method of claim 1, wherein the predetermined recovery process is performed during downtime of the second cluster site as a result of the occurrence of the failure event.

9. A computer program product, the computer program product comprising a computer readable storage medium having program instructions embodied therewith, the program instructions readable and/or executable by a controller to cause the controller to:
   in response to a determination that a predetermined operation has been performed on an object of a first file stored on a first cluster site, store, by the controller, on an extended attribute of the first file stored on the first cluster site, predetermined information about the object of the first file stored on the first cluster site,
   in response to a determination that the predetermined operation is performed on an object of a first file stored on a second cluster site, remove, by the controller, the predetermined information from the extended attribute of the first file stored on the first cluster site; and
   in response to a determination that a failure event has occurred on a queue of the first cluster site, perform, by the controller, a predetermined recovery process thereby enabling fulfillment of entries of the queue of the first cluster site that were lost from the queue of the first cluster site as a result of the occurrence of the failure event,
   wherein performing the predetermined recovery process includes determining files stored on the first cluster site having a respective extended attribute that includes the predetermined information,
   wherein dirty directory comparisons are not relied on for determining the files stored on the first cluster site.

10. The computer program product of claim 9, wherein the predetermined operation is a remove operation, wherein the predetermined information includes a current name of the object of the first file stored on the first cluster site.

11. The computer program product of claim 10, wherein performing the predetermined recovery process includes:
   outputting an instruction to perform the remove operation on objects of files stored on the second cluster site that are associated with objects of the determined files stored on the first cluster site.

12. The computer program product of claim 9, wherein the predetermined operation is a rename operation, wherein the predetermined information includes a parent inode number from which the object of the first file stored on the first cluster site is being renamed.

13. The computer program product of claim 12, wherein performing the predetermined recovery process includes:
   outputting an instruction to perform the rename operation on objects of files stored on the second cluster site that are associated with objects of the determined files stored on the first cluster site.

14. The computer program product of claim 13, wherein the instruction to perform the rename operation includes a sub-instruction for renaming each of the objects of files stored on the second cluster site that are associated with objects of the determined files stored on the first cluster site to a relatively oldest name of an associated object of the determined files stored on the first cluster site.

15. The computer program product of claim 9, wherein the first file stored on the second cluster site is an ongoingly updated copy of the first file stored on the first cluster site.

16. The computer program product of claim 9, wherein the predetermined recovery process is performed during downtime of the second cluster site as a result of the occurrence of the failure event.

17. A system comprising:
a processor; and
logic integrated with the processor, executable by the processor, or integrated with and executable by the processor, the logic being configured to:
in response to a determination that a predetermined operation has been performed on an object of a first file stored on a first cluster site, store, on an extended attribute of the first file stored on the first cluster site, predetermined information about the object of the first file stored on the first cluster site,
in response to a determination that the predetermined operation is performed on an object of a first file stored on a second cluster site, remove the predetermined information from the extended attribute of the first file stored on the first cluster site; and
in response to a determination that a failure event has occurred on a queue of the first cluster site, perform a predetermined recovery process thereby enabling fulfillment of entries of the queue of the first cluster site that were lost from the queue of the first cluster site as a result of the occurrence of the failure event,
wherein performing the predetermined recovery process includes determining files stored on the first cluster site having a respective extended attribute that includes the predetermined information,
wherein dirty directory comparisons are not relied on for determining the files stored on the first cluster site.

18. The system of claim 17, wherein the first file stored on the second cluster site is an ongoingly updated copy of the first file stored on the first cluster site.

19. The system of claim 17, wherein the predetermined operation is a remove operation, wherein the predetermined information includes a current name of the object of the first file stored on the first cluster site.

20. The system of claim 17, wherein the predetermined operation is a rename operation, wherein the predetermined information includes a previous name of the object of the first file stored on the first cluster site.

* * * * *